June 27, 1950     R. H. GURRIES     2,512,795
ATTACHMENT FOR USE WITH AUTOMOBILE HOISTS
Filed Dec. 28, 1948
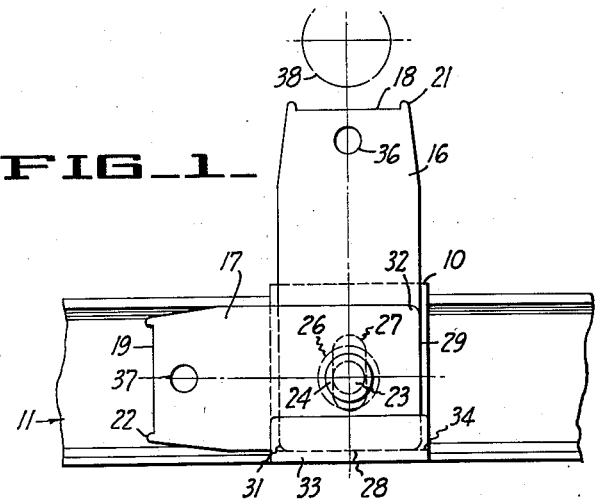
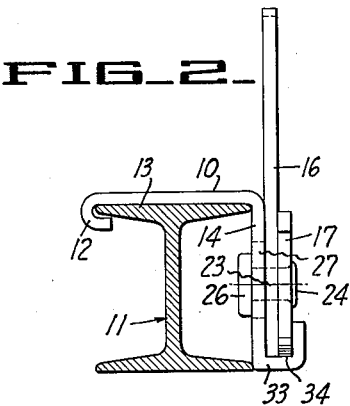
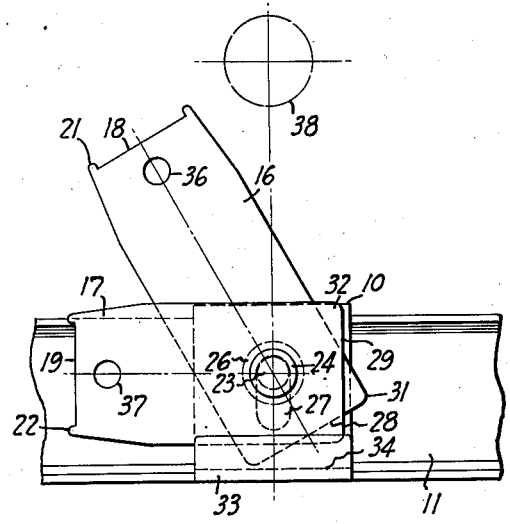
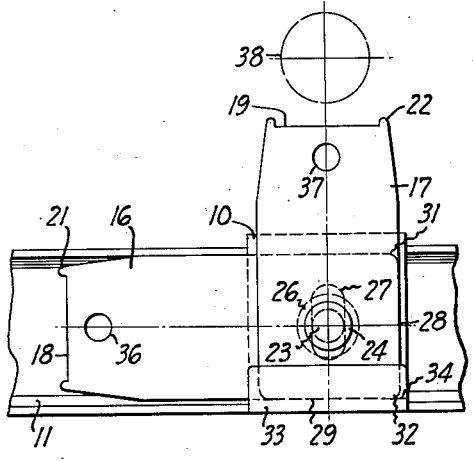
INVENTOR
Robert H. Gurries
BY
*Flehr & Swain*
ATTORNEYS / Patented June 27, 1950

2,512,795

UNITED STATES PATENT OFFICE 2,512,795

ATTACHMENT FOR USE WITH AUTOMOBILE HOISTS

Robert H. Gurries, San Jose, Calif.

Application December 28, 1948, Serial No. 67,615

5 Claims. (Cl. 254—89)

This invention relates generally to devices intended to be used with automobile hoists of the garage or service station type.

Automobile hoists of the above type employ a pair of spaced horizontal rails which are attached to a suitable type of lifting means, such as a vertical pneumatic or hydraulic ram. It is customary to apply individual blocks or jacks to the rails for engaging the front axle and the rear axle housing of the automobile, when the hoist is raised. In the past such jacks have involved the hazard of possible injury to a car, particularly when one attempts to drive a car on or off of the hoist before the jacks have been removed. This is particularly true with the more modern cars which have parts of relatively low clearance. In addition present day devices of this type are not readily adaptable to cars of different makes, and in general their use in a garage or service station is time consuming.

It is an object of the present invention to provide a jack of the above character which will avoid all possible injury to a car being driven on or off of the hoist, irrespective of whether or not the attendant takes the trouble to remove the devices or to position them in an out of the way position.

Another object of the invention is to provide a device of the above character which can be used for a wide variety of automobiles, where the elevation of the front axles or rear axle housings from the ground surface may vary over wide limits.

Additional objects of the invention will appear from the following description in which the preferred embodiment has been set forth in detail in conjunction with the drawing.

Referring to the drawing—

Figure 1 is a side elevational view showing a jack incorporating the present invention.

Figure 2 is an end view of the jack illustrated in Figure 1.

Figure 3 is a side view like Figure 1 but showing the automobile supporting arms in a different operating position.

Figure 4 is a view like Figure 1 but showing another operating position for the automobile supporting arms.

The device as illustrated in the drawing consists of a saddle 10 which is adapted to be seated upon the rail 11 of a hoist. This saddle can be formed of suitable plate steel of proper strength, and its one end portion 12 is bent to substantially U-shaped form to engage one longitudinal edge of the rail flange 13 as illustrated.

The saddle also includes a depending portion 14, which normally extends down along one side of the rail. This depending portion serves to carry a pair of arms 16 and 17 which differ as to length as illustrated. The upper end portions 18 and 19 of these arms are formed to facilitate engagement with an automobile axle or axle housing. Thus they may be formed slightly concave as illustrated, with projections or lugs 21, 22, to minimize the possibility of displacement during a lifting operation.

Pin and slot means serves to connect these arms with the depending saddle portion 14. Thus both arms are bored to receive the retaining pin 23, and the one end of this pin is welded at 24 to the outer and smaller arm 17. The other end of the pin carries the enlarged retaining head 26, and the pin is loosely accommodated in a vertical slot 27 formed in the depending saddle portion 14. The lower end faces 28 and 29 of the two arms are terminated substantially square as illustrated, with the corners 31, 32 being rounded.

Formed integral with the lower end of the depending saddle portion 14, there is a substantially U-shaped portion 33, which retains the lower end portions of the arms when the latter are in raised position, and which also forms a flat horizontal shoulder 34, serving to form a stable supporting surface for the end faces 28 and 29. Note by reference to Figure 1 that the slot 27 is of sufficient length that the end faces 28 and 29 rest and are completely supported by the shoulder 34, when the arms are in raised position. Thus for this position of either arm it has a stable support upon the shoulder 34, during a car lifting operation. Although the arms are held in a stable position during a car lifting operation, either or both of the arms can be swung either forwardly or rearwardly from normal raised position to substantially horizontal out of the way position as shown by dotted lines in Figures 3 and 4. This is because the slot 27 is of such length that pin 23 may raise to permit the arm to be swung forwardly or rearwardly.

Operation of the jack described above is as follows: Four such jacks are commonly employed in connection with an automobile hoist. Normally an operator will swing the arms of all of these devices to an out of the way horizontal position before a car is driven upon the hoist. However, if he neglects to take this precaution and the arms of certain of the devices are left in upright position, no injury is caused to the car, because the arms will be swung to horizontal position if it should strike some part of the car which is relatively low. After the car has been properly located upon the hoist, the operator selects either arms 16 or 17, depending upon the car, and these arms are swung to vertical position by engaging a suitable tool in the openings 36, 37. As indicated in Figures 1 to 4 each raised arm at this time should be directly beneath the axle or axle housing 38. The hoist is now elevated to elevate the car, and as previously pointed out, the downward thrust upon the arm is directly carried by the shoulder 34, and thus the arm is held in stable upright position.

When the hoist is lowered the operator may not take the precaution to swing the raised arms to a lower out of the way position. If the car is driven off of the hoist, engagement of the raised arms with any relatively low portion of the car does not result in injury, but merely causes the raised arms to be swung rearwardly to a horizontal out of the way position. Thus the car is protected against accidental injury for all movements of the car relative to the hoist. At the same time my device greatly facilitates the work of the operator, in that it is readily adaptable to cars of different makes, and the arms can be readily positioned as desired.

I claim:

1. An attachment for use with an automobile hoist, where the hoist consists of spaced rails adapted to extend longitudinally beneath an automobile and attached to lifting means, said attachment comprising a saddle adapted to be seated on a rail, an arm having one end of the same adapted to engage and support an automobile when the arm is in generally upright position, a pin and slot connection between the other end portion of the arm and said saddle, means carried by the saddle forming a support shoulder for the lower end of the arm when the arm is in generally upright position, said pin and slot connection permitting swinging of the arm in either one of two directions longitudinally of the rail to either one of two out of the way positions.

2. An attachment for use with an automobile hoist, where the hoist consists of spaced rails adapted to extend longitudinally beneath an automobile and attached to lifting means, said attachment comprising a saddle adapted to be seated on a rail, said saddle including a substantially vertical portion extending downwardly along one side of the rail, an arm having one end of the same adapted to engage an automobile and to support an automobile when in vertical position, a pin and slot connection between the other end portion of the arm and said vertical portion of the saddle, the lower end of the arm, when the arm is in substantially vertical position, being substantially square, and means carried by the lower end of said vertically extending portion of the saddle and forming a shoulder for supporting said square end of the arm when the arm is in substantially vertical position, said pin and slot connection permitting swinging of said arm either forwardly or rearwardly to either one of two out of the way positions.

3. An attachment for use with an automobile hoist, where the hoist consists of spaced rails adapted to extend longitudinally beneath an automobile and attached to lifting means, said attachment comprising a saddle adapted to be seated on a rail, a pair of arms of unequal length, pin and slot connecting means serving to attach corresponding ends of said arms to said saddle, whereby said arms can be swung in a substantially vertical plane between raised automobile engaging and lowered out of the way positions, and means carried by said saddle forming a supporting shoulder for both said arms, when said arms are in vertical position.

4. An attachment for use with an automobile hoist, where the hoist consists of spaced rails adapted to extend longitudinally beneath an automobile and attached to lifting means, said attachment comprising a saddle adapted to be seated on a rail, said saddle including a depending portion normally in a substantially vertical plane, a pair of arms of unequal length, pin and slot means serving to connect corresponding ends of said arms to said depending portion of the saddle, the ends of said arms adjacent said pin and slot connecting means being substantially square, means carried by said depending portion of the saddle forming a substantially flat shoulder for supporting said square ends of the arms when the arms are in substantially vertical position, the upper ends of said arms when in vertical position being adapted to engage an automobile, said pin and slot connecting means permitting the arms to be swung from vertical position to either one of two substantially horizontal out of the way positions.

5. An attachment as in claim 4 in which the slot is formed vertically in the depending portion of the saddle and the pin is secured to one of the arms.

ROBERT H. GURRIES.

REFERENCES CITED

The following references are of record in the file of this patent:

UNITED STATES PATENTS

| Number | Name | Date |
|---|---|---|
| 2,120,051 | Tully | June 7, 1938 |